(No Model.)
E. L. SCHMITZ.
SAFETY RAZOR.
No. 519,479.  Patented May 8, 1894.
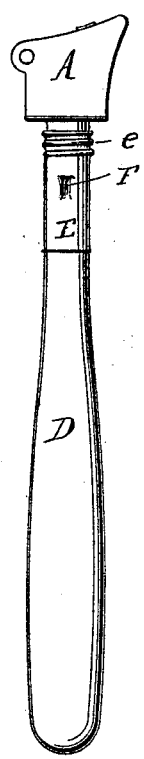
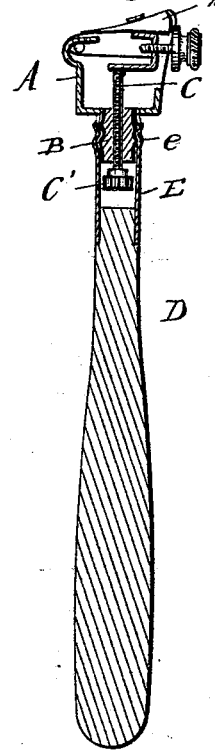
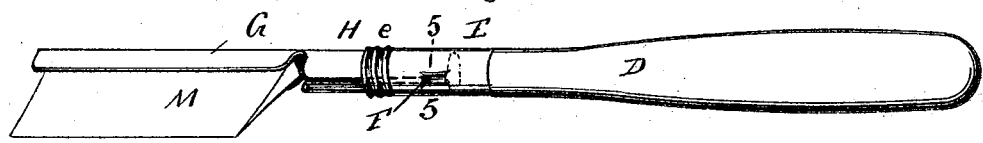
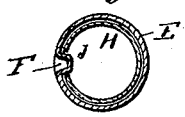
WITNESSES:
INVENTOR
E. L. Schmitz
BY
ATTORNEYS.

UNITED STATES PATENT OFFICE.

EGON LOTHAR SCHMITZ, OF NEW YORK, N. Y.

SAFETY-RAZOR.

SPECIFICATION forming part of Letters Patent No. 519,479, dated May 8, 1894.

Application filed December 19, 1893. Serial No. 494,111. (No model.)

*To all whom it may concern:*

Be it known that I, EGON LOTHAR SCHMITZ, a citizen of the United States, residing in the city, county, and State of New York, have invented certain new and useful Improvements in Safety-Razors, of which the following is a specification.

The object of my invention is to provide a new and improved handle for the razor, which is so constructed that a firmer and better hold can be obtained of the razor and the same moved over the face with greater facility; and a further object of my invention is to provide a handle which can be readily connected with the blade-holder to be used for holding the blade while stropping the same, whereby the blade can be held in such a manner that it does not shift on the handle while stropping, and consequently cannot cut and deface the strop.

The invention consists in the combination with the razor-frame having a screw-threaded stem, of a tapering handle provided at its smaller end with a ferrule, having an internal screw-thread that engages the thread of the screw stem on the razor-frame, said ferrule being also provided on its inner surface with a projection that is adapted to be forced into a slit in the base end of a blade-holder that is inserted in said ferrule.

In the accompanying drawings, Figure 1 is a side view of my improved safety-razor with the improved handle. Fig. 2 is a vertical transverse sectional view of the same. Fig. 3 is a perspective view of the handle and the blade-holder applied on the same; Fig. 4 a face view of the blade-holder, and Fig. 5 an enlarged detail transverse sectional view on the line 5—5, Fig. 3.

Similar letters of reference indicate corresponding parts.

The razor-frame A is provided on its under side with an externally screw-threaded stem B, through which the screw C passes that is used for tightening the blade, the head C' of said screw being below the threaded stem B. The handle D is made of wood, hard rubber, celluloid or other suitable material and is tapered from its lower to its upper end. On the upper end of said handle a ferrule E is fastened which is provided at its upper end with an internal screw-thread $e$ that engages the external thread of the stem B on the bottom of the razor-frame, so that to attach the handle to the razor-frame all that is necessary is to screw the stem B into said ferrule, the head C' of the adjusting screw also passing into the ferrule, as shown in Fig. 2. The ferrule is provided, a short distance below its screw thread with an internal projection F which is preferably formed by pressing part of the metal of the ferrule inward. The blade M is placed into the blade-holder G for stropping. The said holder is provided with a tubular lower spring end H, which has a longitudinal slit J, which tubular lower end of the blade-holder G fits into the ferrule E and when inserted is so placed and held that the internal projection F on the ferrule passes into said slit J of the tubular end H, whereby the said tubular spring end of the holder is expanded within the ferrule and is thus held firmly and securely in said handle so that the danger of cutting or mutilating the strop by an accidental slipping of the blade-holder in the handle is entirely avoided. My improved handle can thus be used with equal facility on the blade-holder and on the razor-frame.

Having thus described my invention, I claim as new and desire to secure by Letters Patent—

In a safety-razor, the combination with a blade-holding frame having a screw-threaded stem on its bottom, of a tapering handle provided at its smaller end with an internally threaded ferrule into which the stem on the blade holding frame can be screwed, said ferrule also having an internal projection, and a blade-holder having a tubular lower spring end fitting in the ferrule of the handle, which tubular end of the blade-holder is provided with a slit into which the interior projection of the ferrule can pass, when the blade-holder is inserted into said ferrule, substantially as set forth.

In testimony that I claim the foregoing as my invention I have signed my name in presence of two subscribing witnesses.

EGON LOTHAR SCHMITZ.

Witnesses:
OSCAR F. GUNZ,
K. R. BRENNAN.